Figure 1:
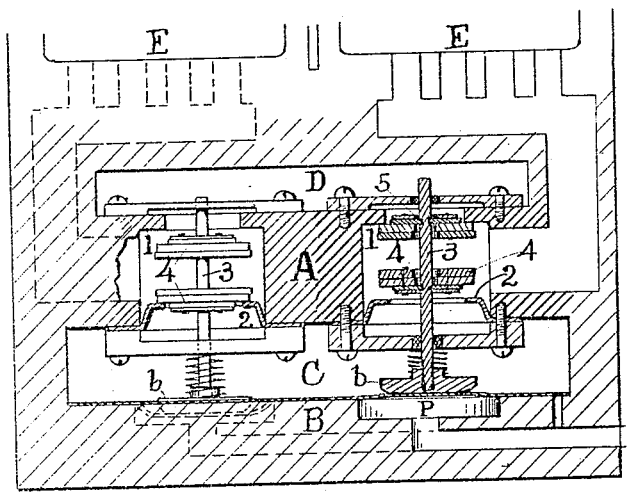

H. W. STOWE.
VALVE FOR PNEUMATICS OF MECHANICAL MUSICAL INSTRUMENTS.
APPLICATION FILED OCT. 27, 1910.

1,012,744.

Patented Dec. 26, 1911.

Witnesses.
Frank O. Woodland
Ella P. Blenus

Inventor.
Horace W. Stowe
By Chas. H. Burleigh
Attorney

UNITED STATES PATENT OFFICE.

HORACE W. STOWE, OF MERIDEN, CONNECTICUT.

VALVE FOR PNEUMATICS OF MECHANICAL MUSICAL INSTRUMENTS.

1,012,744.   Specification of Letters Patent.   Patented Dec. 26, 1911.

Application filed October 27, 1910. Serial No. 589,349.

*To all whom it may concern:*

Be it known that I, HORACE W. STOWE, a citizen of the United States, residing at Meriden, in the county of New Haven and State of Connecticut, have invented a new and useful Improved Valve for Pneumatics of Mechanical Musical Instruments, of which the following is a specification, reference being made therein to the accompanying drawings.

My present invention relates to a novel construction and combination of the valve, and valve-stem, in that class of valves or puppets employed in pneumatic actions for auto-pneumatic music-playing instruments and similar mechanisms; the object being to provide a simple and efficient valve construction, wherein the valves and valve-stems can be conveniently formed and assembled; the valve-disks accurately supported and in a manner to afford yielding elasticity or flexibility at the connecting joint sufficiently to insure accurate conformity of the valve surface to the plane of the valve seat when in use. Also to provide a valve, or valve-puppet for the purpose specified, comprising a circumferentially grooved stem, and a valve-disk, or disks, retained thereon by the elastic constriction of a flexible elastic ply or member of the valve-disk engaging within the groove in the valve-stem, as more fully hereinafter explained. I attain these objects by the construction and means illustrated in the drawings, wherein—

Figure 2:
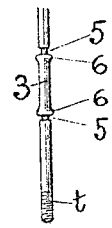
Figure 3:
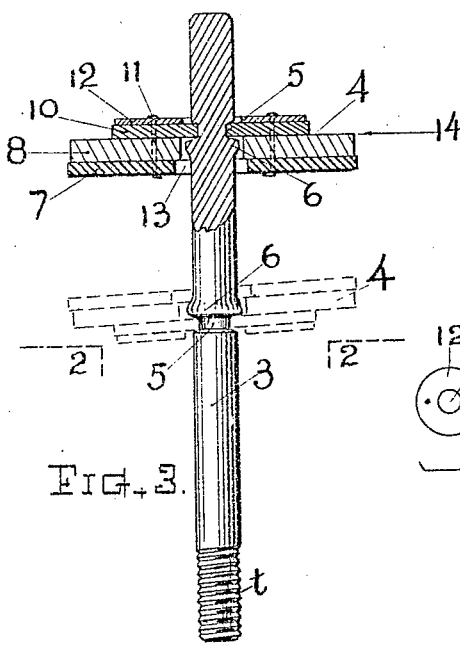
Figure 4:
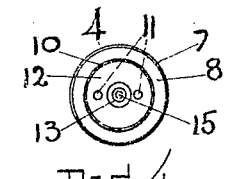
Figure 5:
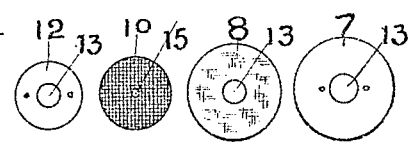

Figure 1 represents a sectional view showing my improved valve construction, and including adjacent parts forming the valve-seats, passages, and actuating pneumatics as employed in an auto-pneumatic music-playing instrument. Fig. 2 is a separate view of the valve-stem. Fig. 3 represents a part side, part sectional view, on a somewhat enlarged scale, showing the details of the valve and valve-stem construction. Fig. 4 is a face view of the valve-disk, and Fig. 5 is a plan view showing separately the several plates or members of which the valve-disk is composed.

In Fig. 1 there are shown two valve puppets, one in side view and one in section. These valves are represented as assembled in the pneumatic action, together with a sufficient portion of the action body with its air channels, valve-seats and pneumatics, to illustrate the general arrangement of the valve mechanism as combined for use.

Of the well known parts shown, A indicates the valve-seat board having the windways and valve pockets therein, and provided with upper and lower valve-seats 1 and 2, as heretofore employed.

B denotes the bed of primary or valve-actuating pneumatics; C the exhaust air chamber; D the free air chamber and E the location of the player pneumatics; which parts may be as in any form of instrument of this class; the subject of my invention being the novel structure pertaining to the valve or valve-puppet.

According to my invention the valve-stem or spindle 3 is made of wire, and around said wire, at the position where the valve-disk 4 is to be located, I form a circumferential groove 5 by turning out a portion of the metal, or preferably by rolling out or upsetting the metal in a manner to create a protuberant ring or collar 6 around the stem adjacent to the groove, but on one edge thereof only, that being the edge of the groove which comes at the back of the valve-disk, or between the upper and lower grooves, as in Fig. 2. In any instance desired the groove 5 may be simply cut into the surface of the wire, the collar or enlargement 6 being omitted, since in practice either form can be advantageously employed. The edges or annular shoulders of the groove are best slightly beveled or rounded outward, leaving the bottom of the groove somewhat narrower than its open outer portion. (See Fig. 3.) The wire stem is threaded at one end $t$ for screwing thereon the button $b$ that rests upon the diaphragm of the valve-actuating pneumatic P, as indicated in Fig. 1.

The complete valve-disk 4 is composed of a number of united disk-members or plies, preferably such as are separately shown in Fig. 5, and including a stiff backing member 7 of vulcanized fiber, or equivalent stiff material; a valve face disk or member 8 of soft sheep leather, such as known as organ leather, for contacting with the valve-seat; an attaching disk-member or ply 10, of comparatively thin flexible elastic skin, such as calf-skin or similar yieldable fabric; and a thin outer disk-member 12 of stiff material preferably aluminum metal; the diameter thereof being approximately the same, or slightly less than that of the member 10, which latter is made somewhat less than the diameter of the opening in the valve-seat. The central openings 13 of the disk-members, excepting that of the skin member 10, are of greater dimension than the diameter of the stem 3. The central opening 15 through the member 10 is made, as a mere perforation of less diameter than the stem, or not greater than the diameter of the small neck of the stem at the bottom of the groove 5. The set of disk-members are assembled in the order shown and secured together by pins 11 inserted therethrough and clenched, or by any equivalent fastening means. The adjacent surfaces of the soft valve-face member 8 and the attaching skin member 10 are in the same plane 14 with the seating face of the valve, which is the annular surface of the member 8 surrounding the periphery of the member 10.

The valve disk is assembled upon the stem by passing the end of the stem through the perforation 15 in the flexible skin ply 10, which stretches sufficiently therefor, then sliding the same into the groove where the elastic closure or constriction of the skin member causes it to hug into the groove and around the neck of the stem forming a nonleakage elastic attaching joint and thereby supporting the valve-disk 4 securely in place upon the stem, but in a manner that affords a degree of flexibility or lateral tilt (see dotted lines Fig. 3) for the valve disk; so that it can readily adjust itself to the plane of the valve-seat whatever deviation there may be between said plane and the perpendicularity of the valve-stem. This mode of supporting and securing the valve-disk upon its stem is simple and inexpensive; permits of the valves being readily removed and replaced on the stem; avoids rigidity in the action, and insures accuracy in construction and assembling; since the space between the two grooves on the stem always regulates the distance between the valving-contact faces of the two valves irrespective of any and all variations in the thickness of the valve-disks, or of the disk-members of which said valve-disks are composed.

What I claim and desire to secure by Letters Patent, is—

1. A valve of the class described, comprising a valve-disk having a seating face, and provided with a ply of elastic material having a central perforation therein of less diameter than the valve stem; in combination with a valve-stem having a circumferential groove formed therein, said valve stem extending through the valve disk, said valve-disk flexibly supported upon said stem by the constriction of the elastic ply within said groove.

2. A valve-device for the purpose specified, comprising a circumferentially grooved stem, and a disk-valve having an elastic attaching member consisting of a disk of thin pliable material disposed adjacent to the face of the valve, said attaching member elastically engaging within the groove of the stem and yieldingly supporting said valve-disk with its face approximately in alinement with one edge of the groove.

3. In a pneumatically actuated valve of the class specified, the wire valve-stem provided with a circumferential groove and a protuberant enlargement of the wire adjacent to one edge of the groove; in combination with a valve-disk comprising an annular back-plate and face member and provided adjacent to its face with a flexible attaching member of elastic material having a central perforation of less diameter than the body of the wire stem, said attaching member elastically embracing the neck within the groove of said stem, the enlargement of the stem being at the back of the valve attaching member.

4. A pneumatic-action valve of the character described, composed of the stiff annular-plate backing member, a valve-face member of soft sheep-leather supported against said backing member, an annular nonflexible front-plate, and an interposed attaching member of thin elastic skin having a central perforation therein of less diameter than the ungrooved part of the stem, said front-plate and attaching-member being of less diameter than the valve-face and arranged thereon within the concentric exposed annular valve-face area, means connecting said members together as a unitary valve-disk, and a wire stem extending through said valve-disk, said stem being circumferentially grooved or shouldered and said valve-disk confined thereon by elastic constriction of the perforated attaching member within the groove of the stem; in combination with a valve-seat having an opening of larger diameter than said front-plate, and guides for said valve-stem above and below the valve.

5. A valve-puppet for the purpose described, comprising a wire stem having a plurality of circumferential grooves formed therein respectively at positions approximately coincident with the spacing required between the faces of the valves, a pair of oppositely facing valves mounted on said stem, each valve composed of united disk members including a ply or member of elastic material having a central perforation therethrough of less diameter than the wire stem, said ply or member disposed adjacent to the contact-face of the valve, said valves being flexibly supported upon the wire stem by the central perforated portion of their semi-elastic members closely embracing the stem within the respective grooves, and retained therein by the elastic constriction of said perforation.

6. In a pneumatic music-playing instrument, in combination with the valve-seat-board, provided with upper and lower valve-seats, air passages, valve-stem guides, and the valve-actuating pneumatic, a valve-puppet comprising a wire stem provided with upper and lower circumferential grooves, and having protuberant circumferential rings or enlargements formed thereon between and adjacent to the respective grooves, and a pair of oppositely facing valve-disks, each composed of stiff annular outer members, a soft contacting member, and an interposed semi-elastic skin member secured between said outer members, and having a small central hole therethrough of less diameter than the stem, said valve-disks being detachably connected with the stem by the elastic skin members constrictively engaging within the respective grooves of the stem, the enlarged portions of the stem being at the back of the engaging members and supporting the same in opposition to pressure on the valve-seats.

Witness my hand this 25th day of October, 1910.

HORACE W. STOWE.

Witnesses:
N. E. TURNER,
L. A. KUHNLE.